Figure 1:
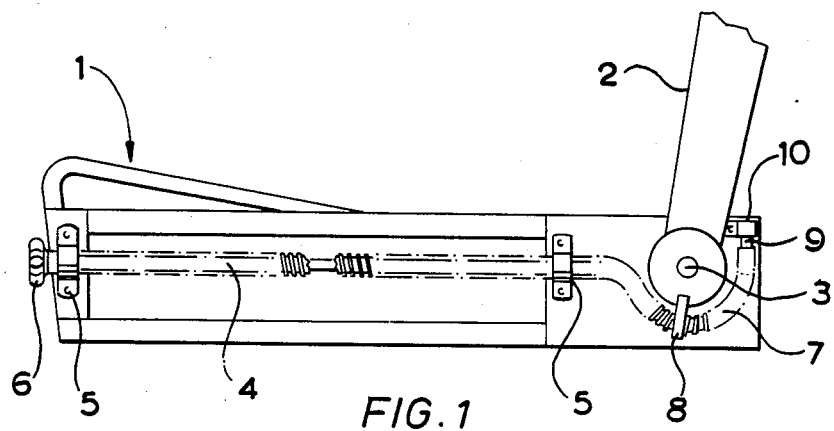

United States Patent [19]

Harrison

[11] Patent Number: 4,570,999
[45] Date of Patent: Feb. 18, 1986

[54] RECLINING SEAT PARTICULARLY FOR VEHICLES

[75] Inventor: Neil Harrison, Sutton Coldfield, England

[73] Assignee: I.H.W. Engineering Ltd., Warwick, England

[21] Appl. No.: 615,182

[22] Filed: May 30, 1984

[30] Foreign Application Priority Data

May 31, 1983 [GB] United Kingdom ............... 8314900
May 31, 1983 [GB] United Kingdom ............... 8314902

[51] Int. Cl.⁴ .............................................. B60N 1/02
[52] U.S. Cl. .................................. 297/362; 74/89.15
[58] Field of Search ............... 297/361, 362; 248/393; 74/89.15

[56] References Cited

U.S. PATENT DOCUMENTS

| 2,580,889 | 1/1952 | Carlson | 74/89.15 |
| 2,596,760 | 5/1952 | Bryant | 297/361 |
| 2,653,648 | 9/1953 | Marshall | 297/361 X |

FOREIGN PATENT DOCUMENTS

| 2231402 | 1/1974 | Fed. Rep. of Germany | 297/361 |
| 778572 | 3/1935 | France | 297/362 |
| 193497 | 2/1923 | United Kingdom | 297/361 |

*Primary Examiner*—William E. Lyddane
*Assistant Examiner*—José0 V. Chen
*Attorney, Agent, or Firm*—Jones & Askew

[57] ABSTRACT

The seat has a cushion portion and a back portion connected thereto by a pivot. The back portion is rotated relative to the cushion portion about the pivot by a flexible threaded tube rotatably attached to the frame of the cushion portion and passing through a threaded member on the back portion. Rotation of the tube by means of a hand wheel, or an electric motor, drives the threaded member. The thread is selected to be self-locking.

6 Claims, 2 Drawing Figures

RECLINING SEAT PARTICULARLY FOR VEHICLES

This invention relates to a reclining seat which is particularly, but not exclusively, for use in motor vehicles.

In motor vehicles and the like, it is usual to pivot the back of the seat relative to the cushion, so that the angle of the back of the seat may be adjusted to suit the user of the seat. Various mechanisms are known for permitting adjustment of the back of the seat to the desired angle and locking of the back at that angle. Typically such mechanisms take the form of a gear mechanism located on the pivot axis of the seat back. A disadvantage with this type of mechanism is that its construction requires a high degree of precision and this can add significantly to the cost of a seat. An additional disadvantage is that the drive for the mechanism, typically a hand wheel, is located at a position which is inconvenient for the person sitting in the seat to operate.

Various proposals have been made to use a screw on one part of the seat co-operating with a threaded member acting on the other part of the seat. An example is shown in GB-A-No. 1057057, wherein the screw is in the form of a rod having a hand wheel at one end and a screw-threaded portion at the other end passing through a threaded socket in a plunger which in turn engages a slot in a plate attached to the back portion of the seat. This arrangement suffers from two principle problems. Because the plunger effectively moves radially of the pivot for the seat back portion during pivoting thereof, the speed of reclining of the seat is not uniform and secondly at positions away from the upright, the seat back portion exerts, via the slot, a substantial load transversely of the axis of the rod. This in turn requires the rod as well as the plate having the slot to have high tensile strength, and greatly increases friction on the thread at these positions, making the hand wheel more difficult to turn.

Accordingly, the invention provides a seat comprising a cushion portion and a back portion pivotally connected thereto, and a flexible screw threaded drive member rotatably attached to one of the two portions and operatively engaging a threaded member secured to the other of the two portions, whereby rotation of the drive member causes relative pivoting movement of the two portions.

Preferably, the drive member is a flexible tube arranged to rotate around a rigid supporting core attached to the said one of the two portions. The tube preferably forms a segment of a circle around the pivot point for the back portion relative to the cushion portion, the threaded member extending below the pivot point from the back portion. Thus, the point of contact between the threaded tube and the threaded member is maintained at a constant radius from the pivot point.

The screw threaded drive member may be provided with a hand wheel at one end thereof, rotation of the hand wheel causing rotation of the drive member. Alternatively, drive means, for example an electric motor, may be provided at any suitable point, for example beneath the cushion portion.

The seat is simple in construction and the convenient location of the hand wheel makes the reclining of the seat easy to operate. The pitch of the screw threaded drive member is chosen such that the back portion is self-locking at any desired position, thus obviating the need for a separate locking mechanism.

Figure 2:
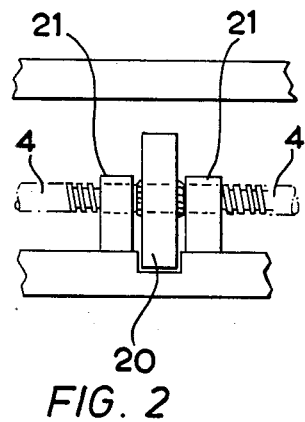

Reference is made to the drawing, in which:

FIG. 1 is a partial side elevation of a seat in accordance with the invention; and FIG. 2 is an enlarged detail view of an alternative embodiment.

The seat comprises a frame 1 of generally conventional form which may be suitably padded to provide the cushion portion, and a back portion 2 mounted on a pivot 3 secured to the frame 1. A flexible screw threaded tube 4 is mounted along the side of the tubular frame by brackets 5 which permit its free rotation. A hand wheel 6 is provided at the front of the frame, secured to the tube 4 so as to permit the tube to be turned. The tube is brought into a circular curved portion 7 equidistant from the pivot 3 at all points. The tube 4 passes through a threaded member 8 extending from, but rigidly attached to, the back portion 2 at a position below the pivot 3. The tube is mounted over a rigid supporting core 9 which extends throughout its length and is anchored to the frame 1 at an anchorage point 10.

In use, rotation of the hand wheel 6 causes rotation of the tube 4 around the core 9, and this in turn causes the threaded member 8 to move about the pivot 3, thereby pivoting the back portion 2 relative to the cushion portion. It will be seen that the hand wheel may be arranged at any suitable position, convenient for manual operation by a person sitting in the seat, simply by curving the flexible tube, and its supporting core, appropriately.

The alterative embodiment illustrated by FIG. 2 provides a thumbwheel 20 mounted between two supports 21 fixed to the frame 1. The thumbwheel 20 is fixed to the flexible tube 4, e.g. by welding, and the tube 4 passes in a freely rotatable manner through the supports 21. Rotation of the thumbwheel 20 causes rotation of the tube 4 around the core 9, thus pivoting the back portion 2 relative to the cushion portion in exactly the same manner as hereinbefore described with reference to FIG. 1. The thumbwheel may be provided instead of the hand wheel 6, or in addition thereto to provide alternative adjustment positions to suit different users of the seat.

I claim:

1. A seat comprising:
   a cushion portion and a back portion pivotally connected thereto;
   a flexible externally screw-threaded tubular drive member arranged to rotate around a rigid supporting core attached to one of said portions;
   drive means for imparting rotational movement to said drive member and operatively associated with said drive member;
   the drive member being rotatably attached to said one portion, and said rigid supporting core having a part which forms a segment of a circle around the pivot point for the back portion relative to the cushion portion; and
   an internally threaded member secured to the other of said portions and operatively engaging said part, whereby rotation of the drive member causes the internally threaded member to move around said segment, thereby causing relative pivoting motion of the two portions.

2. A seat according to claim 1, wherein said drive means comprise a hand wheel.

3. A seat according to claim 2, wherein the hand wheel is positioned at a free end of the drive member.

4. A seat according to claim 2, wherein the hand wheel is positioned intermediate the ends of the drive member.

5. A seat according to claim 1, wherein said drive means comprise an electric motor.

6. A seat comprising:
- a cushion portion and a back portion pivotally connected thereto, and a drive member mounted for rotation on a rigid support attached to one of the portions;
- said drive member being provided with drive means for imparting rotational movement to said drive member;
- said drive member being rotatably attached to said one portion and having a flexible externally screw-threaded part engaged by said rigid support to a segment of a circle around the pivot point for the back portion relative to the cushion portion; and
- an internally threaded member secured to the other of the portions and operatively engaging said flexible screw-threaded part, whereby rotation of the drive member causes the threaded member to move around said circular segment, thereby causing relative pivoting motion of the two portions.

* * * * *